United States Patent
Takahashi et al.

(10) Patent No.: US 11,414,570 B2
(45) Date of Patent: Aug. 16, 2022

(54) RESIN FOAM, RESIN FOAM SHEET, ADHESIVE TAPE, VEHICLE MEMBER, AND BUILDING MEMBER

(71) Applicant: SEKISUI CHEMICAL CO., LTD., Osaka (JP)

(72) Inventors: Katsunori Takahashi, Shiga (JP); Juichi Fukatani, Osaka (JP); Tomohiro Hida, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 107 days.

(21) Appl. No.: 16/628,298

(22) PCT Filed: Jul. 5, 2018

(86) PCT No.: PCT/JP2018/025473
§ 371 (c)(1),
(2) Date: Jan. 3, 2020

(87) PCT Pub. No.: WO2019/009351
PCT Pub. Date: Jan. 10, 2019

(65) Prior Publication Data
US 2020/0216719 A1    Jul. 9, 2020

(30) Foreign Application Priority Data

Jul. 7, 2017 (JP) .............................. JP2017-134168
Nov. 10, 2017 (JP) .............................. JP2017-217412

(51) Int. Cl.
*C09J 7/26* (2018.01)
*C08J 9/00* (2006.01)

(52) U.S. Cl.
CPC ............... *C09J 7/26* (2018.01); *C08J 9/0023* (2013.01); *C08J 2329/14* (2013.01); *C09J 2400/243* (2013.01); *C09J 2459/006* (2013.01)

(58) Field of Classification Search
None
See application file for complete search history.

(56) References Cited

U.S. PATENT DOCUMENTS

| 2005/0249911 | A1 | 11/2005 | Randall et al. | |
|---|---|---|---|---|
| 2008/0135159 | A1* | 6/2008 | Bries | B32B 7/12 |
| | | | | 156/160 |
| 2015/0030839 | A1* | 1/2015 | Satrijo | C09J 7/387 |
| | | | | 428/220 |
| 2019/0127544 | A1 | 5/2019 | Takahashi | |

FOREIGN PATENT DOCUMENTS

| CN | 102382406 | 3/2012 | |
|---|---|---|---|
| EP | 2 799 472 | 11/2014 | |
| EP | 2799472 A1 * | 11/2014 | ............. C08J 9/122 |
| JP | 62-59640 | 3/1987 | |
| JP | 10-52268 | 2/1998 | |
| JP | 2007-536440 | 12/2007 | |
| JP | 2010-100778 | 5/2010 | |
| JP | 2015-44887 | 3/2015 | |
| JP | 2015-52726 | 3/2015 | |
| JP | 2016-79361 | 5/2016 | |
| JP | 2017-133002 | 8/2017 | |
| WO | 2005/116325 | 12/2005 | |
| WO | 2013/100015 | 7/2013 | |
| WO | 2017/112537 | 6/2017 | |
| WO | 2018/016536 | 1/2018 | |

OTHER PUBLICATIONS

International Search Report dated Oct. 9, 2018 in International (PCT) Application No. PCT/JP2018/025473.
Extended European Search Report dated Feb. 16, 2021 in corresponding European Patent Application No. 18827512.7.
Communication pursuant to Article 94(3) EPC dated Jan. 12, 2022 in corresponding European Patent Application No. 18 827 512.7.

* cited by examiner

*Primary Examiner* — Chinessa T. Golden
(74) *Attorney, Agent, or Firm* — Wenderoth, Lind & Ponack, L.L.P.

(57) ABSTRACT

The present invention aims to provide a flexible resin foam having excellent shapeability and a resin foam sheet, an adhesive tape, a member for a vehicle, and a member for a building each including the resin foam. Provided is a resin foam having a multitude of cells, the resin foam including: a polyvinyl acetal; and a plasticizer, the resin foam having an elongation strain of 300% or more and a 50% compression stress of 70 kPa or less.

7 Claims, No Drawings

RESIN FOAM, RESIN FOAM SHEET, ADHESIVE TAPE, VEHICLE MEMBER, AND BUILDING MEMBER

TECHNICAL FIELD

The present invention relates to a flexible resin foam having excellent shapeability and a resin foam sheet, an adhesive tape, a member for a vehicle, and a member for a building each including the resin foam.

BACKGROUND ART

Resin foams are light, flexible, and excellent in shock resistance, sound insulating properties, and the like. Resin foams are thus used in various applications such as members for vehicles (e.g., automobiles, aircraft, and ships), members for buildings, electronic components, members for interior materials such as carpet backing materials, and electrical appliances for home and commercial uses (for example, Patent Literature 1). Resin foams with high open cell ratios have particularly excellent flexibility.

Conventional resin foams, however, easily break when formed into a desired shape, exhibiting poor shapeability. For example, forming a conventional resin foam into a sheet shape may cause breaking or the like of the resin foam due to stretching.

CITATION LIST

Patent Literature

Patent Literature 1: JP 2015-52726 A

SUMMARY OF INVENTION

Technical Problem

In view of the situation in the art, the present invention aims to provide a flexible resin foam having excellent shapeability and a resin foam sheet, an adhesive tape, a member for a vehicle, and a member for a building each including the resin foam.

Solution to Problem

The present invention relates to a resin foam having a multitude of cells, the resin foam including: a polyvinyl acetal; and a plasticizer, the resin foam having an elongation strain of 300% or more and a 50% compression stress of 70 kPa or less.

The present invention is described in detail below.

The inventors made intensive studies to find out that a resin foam containing a polyvinyl acetal and a plasticizer and having an elongation strain of 300% or more and a 50% compression stress of 70 kPa or less is flexible and excellent in shapeability. The inventors found out that forming such a resin foam into, for example, a sheet shape does not cause breaking or the like. The inventors thus completed the present invention.

The resin foam of the present invention contains a polyvinyl acetal and a plasticizer.

The polyvinyl acetal may be any polyvinyl acetal obtained by acetalizing polyvinyl alcohol with an aldehyde, and is preferably polyvinyl butyral. As needed, two or more polyvinyl acetals may be used in combination.

The lower limit of the degree of acetalization of the polyvinyl acetal is preferably 40 mol % and the upper limit thereof is preferably 85 mol %. The lower limit is more preferably 60 mol % and the upper limit thereof is more preferably 75 mol %.

The lower limit of the hydroxy group content of the polyvinyl acetal is preferably 15 mol % and the upper limit thereof is preferably 40 mol %. With the hydroxy group content within this range, the polyvinyl acetal has high compatibility with the plasticizer.

The degree of acetalization and the hydroxy group content can be measured in conformity with "Testing Methods for Polyvinyl Butyral", JIS K6728, for example.

The polyvinyl acetal can be prepared by acetalizing polyvinyl alcohol with an aldehyde.

The polyvinyl alcohol is commonly prepared by saponifying polyvinyl acetate. Polyvinyl alcohol with a degree of saponification of 70 to 99.8 mol % is normally used. The degree of saponification of the polyvinyl alcohol is preferably 80 to 99.8 mol %.

The lower limit of the degree of polymerization of the polyvinyl alcohol is preferably 500 and the upper limit thereof is preferably 4,000. When the degree of polymerization of the polyvinyl alcohol is 500 or higher, the resulting resin foam has excellent handleability. When the degree of polymerization of the polyvinyl alcohol is 4,000 or lower, formation of the resin foam is facilitated. The lower limit of the degree of polymerization of the polyvinyl alcohol is more preferably 1,000 and the upper limit thereof is more preferably 3,600.

Any aldehyde may be used. Commonly, a C1-C10 aldehyde is suitably used. Any C1-C10 aldehyde may be used. Examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. These aldehydes may be used alone or in combination of two or more thereof. Preferred among them are C2-C10 aldehydes from the standpoint of making it easy to design the resulting foam resin to have high loss factor. More preferred are n-butyraldehyde, n-hexylaldehyde, and n-valeraldehyde, with n-butyraldehyde being particularly preferred.

Any plasticizer may be used. Examples thereof include organic ester plasticizers such as monobasic organic acid esters and polybasic organic acid esters and phosphoric acid plasticizers such as organophosphate plasticizers and organophosphite plasticizers. The plasticizer is preferably a liquid plasticizer.

Any monobasic organic acid ester may be used, and examples thereof include glycol esters obtained by a reaction between a glycol and a monobasic organic acid.

Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octylic acid, 2-ethylhexylic acid, pelargonic acid (or n-nonylic acid), and decylic acid. In particular, preferred are triethylene glycol dicaproate, triethylene glycol di-2-ethylbutyrate, triethylene glycol di-n-octylate, and triethylene glycol di-2-ethylhexylate.

Any polybasic organic acid ester may be used, and examples thereof include ester compounds of a polybasic organic acid (e.g., adipic acid, sebacic acid, and azelaic acid) and a C4-C8 linear or branched alcohol. In particular, preferred are dibutyl sebacate, dioctyl azelate, and dibutyl carbitol adipate.

Any organic ester plasticizer may be used, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, diisononyl adipate, heptylnonyl adipate, dibutyl sebacate, oil-modified sebacic alkyds, mixtures of phosphoric acid esters and adipic acid esters, adipic acid esters, mixed type adipic acid esters prepared from C4-C9 alkyl alcohols and C4-C9 cyclic alcohols, and C6-C8 adipic acid esters such as hexyl adipate.

Any organophosphate plasticizer may be used, and examples thereof include tributoxyethyl phosphate, isodecylphenyl phosphate, and triisopropyl phosphate.

For less hydrolysis, the plasticizer contains preferably triethylene glycol di-2-ethylhexanoate (3GO), triethylene glycol di-2-ethylbutyrate (3GH), tetraethylene glycol di-2-ethylhexanoate (4GO), or dihexyl adipate (DHA), more preferably tetraethylene glycol di-2-ethylhexanoate (4GO) or triethylene glycol di-2-ethylhexanoate (3GO), still more preferably triethylene glycol di-2-ethylhexanoate (3GO).

The amount of the plasticizer in the resin foam of the present invention is not limited. The lower limit thereof relative to 100 parts by weight of the polyvinyl acetal is preferably 5 parts by weight and the upper limit thereof is preferably 60 parts by weight. The plasticizer in an amount within this range allows the resin foam to exhibit shapeability, and does not bleed out from the resin foam. The lower limit of the amount of the plasticizer is more preferably 20 parts by weight and the upper limit thereof is more preferably 55 parts by weight.

The resin foam of the present invention preferably further contains an adhesive. With the adhesive, the resin foam of the present invention can exhibit adhesiveness, which improves handleability.

Any adhesive may be used. Examples thereof include known adhesives such as acrylic adhesives, urethane adhesives, and rubber adhesives.

The resin foam of the present invention may contain, in addition to the polyvinyl acetal and the plasticizer, additives such as an adhesion modifier, a heat absorbing agent, a UV shielding agent, an antioxidant, a light stabilizer, and an antistatic agent. The resin foam may also contain a pigment such as carbon black or a dye to adjust the appearance of the resin foam.

The resin foam of the present invention has an elongation strain of 300% or more and a 50% compression stress of 70 kPa or less.

The elongation strain as used herein means a value indicating the extent of deformation applied to the resin foam in a sheet form when a uniaxial elongation deformation is applied to the resin foam. With the elongation strain of 300% or more, the resin foam of the present invention can exhibit excellent shock resistance. The elongation strain is preferably 400% or more, more preferably 500% or more. The upper limit of the elongation strain is not limited, but is practically about 800%.

The 50% compression stress as used herein means a value indicating the stress applied to the resin foam in a sheet form when the resin foam is compressed by 50% in its thickness direction. With the 50% compression stress of 70 kPa or less, the resin foam of the present invention can exhibit excellent shapeability. The 50% compression stress is preferably 30 kPa or less, more preferably 20 kPa or less. The lower limit of the 50% compression stress is not limited, but is practically about 5 kPa.

The elongation strain and the 50% compression stress each can be measured by a method in conformity with JIS K 6767.

The above elongation strain and 50% compression stress can be achieved by adjusting the foam state of the resin foam.

Specifically, for example, the open cell ratio of the resin foam is preferably 20% or higher. An open cell ratio of 20% or higher enables adjustment of the 50% compression stress of the resulting resin foam within a predetermined range, leading to very high flexibility. The open cell ratio is more preferably 30% or higher, still more preferably 40% or higher, particularly preferably 50% or higher. The upper limit of the open cell ratio is not limited, but is practically about 98%.

The open cell as used herein refers to cells connected to each other in the resin foam.

The open cell ratio is defined as the volumetric ratio of cells connected to the outside of the resin foam relative to the apparent volume of the resin foam determined by size measurement, and can be determined by pycnometry described in JIS K7138 or the like.

The resin foam of the present invention preferably has an apparent density of 50 $kg/m^3$ or more. When the apparent density is 50 $kg/m^3$ or more, the elongation strain of the resin foam can be adjusted within a predetermined range, so that the resin foam can have very good shapeability. The apparent density is more preferably 60 $kg/m^3$ or more, still more preferably 80 $kg/m^3$ or more, particularly preferably 100 $kg/m^3$ or more. The resin foam of the present invention preferably has an apparent density of 500 $kg/m^3$ or less. When the apparent density is 500 $kg/m^3$ or less, the resin foam can exhibit better shapeability. The apparent density is more preferably 300 $kg/m^3$ or less, still more preferably 200 $kg/m^3$ or less.

The lower limit of the average cell size of the resin foam of the present invention is preferably 100 μm and the upper limit thereof is preferably 1,000 μm. With the average cell size within this range, the resin foam can exhibit higher flexibility and higher shapeability. The lower limit of the average cell size is more preferably 120 μm and the upper limit thereof is more preferably 500 μm. The lower limit is still more preferably 200 μm.

The average cell size can be determined by observing cell walls and void spaces in a cross-sectional photograph of cells and measuring the sizes of the void spaces.

The resin foam of the present invention preferably has an average aspect ratio of cells of 2 or less. When the average aspect ratio of cells is 2 or less, the resin foam can exhibit higher flexibility and higher shapeability. The average aspect ratio of cells is more preferably 1.5 or less.

The average aspect ratio of cells can be determined by measuring the major axis and minor axis of each void space in a cross-sectional photograph of cells and calculating the ratio of the axes.

The resin foam of the present invention may be produced by any method. It is preferably produced by a method of blending the polyvinyl acetal, the plasticizer, and additives according to needs with a heat-decomposable foaming agent to prepare a resin composition and then heating the resin composition to a foaming temperature to decompose the heat-decomposable foaming agent.

For adjusting the open cell ratio to 20% or higher and the elongation strain and 50% compression stress to predetermined ranges to achieve very high shapeability, it is significantly important to appropriately set the type and amount of the heat-decomposable foaming agent and the foaming temperature in production of the resin foam. In particular, setting of the foaming temperature is essential to achieve the high open cell ratio.

The foaming temperature is preferably 180° C. or higher. When the foaming temperature is 180° C. or higher, the resin composition upon foaming is sufficiently softened to facilitate communication between cells, presumably facilitating generation of open cells. An increase in the open cell ratio along with an increase in the foaming temperature seems to be a phenomenon peculiar to a resin composition containing a polyvinyl acetal and a plasticizer because such phenomenon is not observed in the case of a resin composition containing a resin other than polyvinyl acetal.

The heat-decomposable foaming agent may be any conventionally known foaming agent having a decomposition temperature of about 120° C. to 240° C. For a higher open cell ratio, the heat-decomposable foaming agent preferably has a decomposition temperature higher by 20° C. or more, more preferably by 50° C. or more, than the molding temperature of the resin composition as a raw material before foaming.

Specific examples of the heat-decomposable foaming agent include azodicarbonamide, N,N'-dinitrosopentamethylenetetramine, 4,4'-oxybis(benzenesulfonylhydrazide), urea, sodium hydrogen carbonate, and mixtures of these.

Examples of commercial products of the heat-decomposable foaming agent include CELLMIC series (available from Sankyo Kasei Co., Ltd.) and VINYFOR series, CELLULAR series, and NEOCELLBORN series (available from Eiwa Chemical Inc. Co., Ltd.).

The amount of the heat-decomposable foaming agent in the resin composition is not limited. The lower limit of the amount of the heat-decomposable foaming agent is preferably 3 parts by weight and the upper limit thereof is preferably 20 parts by weight, relative to 100 parts by weight of the polyvinyl acetal. With the amount of the heat-decomposable foaming agent within this range, the foam having an open cell ratio of 10% or higher can be produced. The lower limit of the amount of the heat-decomposable foaming agent is more preferably 5 parts by weight and the upper limit thereof is more preferably 15 parts by weight.

The resin foam of the present invention has the structure described above, and thus can be flexible while exhibiting very high shapeability that has been unachievable by conventional resin foams. The resin foam of the present invention thus can be used in various applications such as members for vehicles (e.g., automobiles, aircraft, and ships), members for buildings, electronic components, members for interior materials such as carpet backing materials, and electrical appliances for home and commercial uses. The resin foam of the present invention in a sheet form can be used in particularly wide applications.

The present invention also encompasses a resin foam sheet containing the resin foam of the present invention.

An adhesive tape including an adhesive layer provided on at least one surface of the resin foam sheet of the present invention has very good handleability.

The present invention also encompasses an adhesive tape including the resin foam sheet of the present invention and an adhesive layer provided on at least one surface of the resin foam sheet.

The adhesive layer may contain any adhesive. Examples thereof include known adhesives such as acrylic adhesives, urethane adhesives, and rubber adhesives.

Here, since the resin foam sheet of the present invention contains a plasticizer, the plasticizer may migrate to the adhesive layer and decrease the adhesive force. The adhesive layer thus preferably has high plasticizer resistance.

Examples of the adhesive layer having high plasticizer resistance include those formed from an adhesive composition containing an acrylic polymer (X), a tackifier resin (Y) having a softening point of 140° C. to 160° C., and a cross-linking agent (Z). Use of such an adhesive composition reduces the decrease in adhesive force with time due to migration of the plasticizer.

The components constituting the adhesive composition are described in detail below.

The acrylic polymer (X) is a polymer obtained by polymerizing a monomer mixture containing: 100 parts by weight of an alkyl (meth)acrylate monomer (A) containing 60% by weight or more an alkyl (meth)acrylate monomer (a) that has an alkyl group with a carbon number of 4 or less; and 5 to 18 parts by weight of a carboxy group-containing monomer (B).

The (meth)acrylic acid as used herein means acrylic acid or methacrylic acid. The (meth)acrylate as used herein means acrylate or methacrylate.

The alkyl (meth)acrylate monomer (A) preferably contains 60% by weight or more an alkyl (meth)acrylate monomer (a) that has an alkyl group with a carbon number of 4 or less. When the amount of the alkyl (meth)acrylate monomer (a) that has an alkyl group with a carbon number of 4 or less is 60% by weight or more, the resulting adhesive layer has high plasticizer resistance. The amount of the alkyl (meth)acrylate monomer (a) is more preferably 80% by weight or more, still more preferably 90% by weight or more, particularly preferably 100% by weight from the standpoint of reducing a decrease in adhesive force to soft polyvinyl chloride.

Specific examples of the alkyl (meth)acrylate monomer (a) include methyl (meth)acrylate, ethyl (meth)acrylate, propyl (meth)acrylate, isopropyl (meth)acrylate, n-butyl (meth)acrylate, isobutyl (meth)acrylate, and t-butyl (meth)acrylate. These alkyl (meth)acrylate monomers (a) may be used alone or in combination of two or more thereof. In particular, the alkyl (meth)acrylate monomer (a) preferably contains n-butyl (meth)acrylate, more preferably contains only n-butyl (meth)acrylate alone.

The alkyl (meth)acrylate monomer (A) may contain an alkyl (meth)acrylate monomer (b) that has an alkyl group with a carbon number of 5 or more.

Specific examples of the alkyl (meth)acrylate monomer (b) include 2-ethylhexyl (meth)acrylate, isooctyl (meth)acrylate, isononyl (meth)acrylate, and lauryl (meth)acrylate.

When the alkyl (meth)acrylate monomer (A) contains the alkyl (meth)acrylate monomer (b), the amount of thereof in the alkyl (meth)acrylate monomer (A) is preferably 20% by weight or less, more preferably 10% by weight or less.

The carboxy group-containing monomer (B) is a polymerizable monomer having a carboxy group in the molecule, preferably a vinyl monomer containing a carboxy group.

Specific examples of the carboxy group-containing monomer (B) include (meth)acrylic acid, itaconic acid, maleic acid, fumaric acid, and crotonic acid. These carboxy group-containing monomers (B) may be used alone or in combination of two or more thereof. Among them, (meth)acrylic acid is preferred, and acrylic acid is more preferred.

The monomer mixture as a raw material of the acrylic polymer (X) may further contain a monomer other than the alkyl (meth)acrylate monomer (A) and the carboxy group-containing monomer (B).

Examples of such other monomers include monomers containing a polar group other than a carboxy group and styrene monomers such as styrene, α-methylstyrene, o-methylstyrene, and p-methylstyrene.

In the monomer mixture as a raw material of the acrylic polymer (X), the lower limit of the amount of the carboxy group-containing monomer (B) relative to 100 parts by weight of the alkyl (meth)acrylate monomer (A) is preferably 5 parts by weight and the upper limit thereof is preferably 18 parts by weight. Use of 5 parts by weight or more of the carboxy group-containing monomer (B) allows the resulting adhesive layer to have high plasticizer resistance. The lower limit of the amount of the carboxy group-containing monomer (B) is more preferably 6 parts by weight and the upper limit thereof is more preferably 17 parts by weight. The lower limit is still more preferably 10 parts by weight and the upper limit is still more preferably 15 parts by weight.

The lower limit of the weight average molecular weight of the acrylic polymer (X) is preferably 550,000 and the upper limit thereof is preferably 1,000,000. When the weight average molecular weight is 550,000 or more, the resulting adhesive layer has high plasticizer resistance. When the weight average molecular weight is 1,000,000 or less, the adhesive layer is less likely to be too hard and thus can exhibit adhesive force to an adherend with a complex shape. The lower limit of the weight average molecular weight is more preferably 600,000 and the upper limit thereof is more preferably 800,000. The lower limit is still more preferably 650,000 and the upper limit is still more preferably 750,000.

The acrylic polymer (X) is obtained by polymerizing the monomer mixture.

Any polymerization method may be used. An exemplary method involves radical polymerization of the monomer mixture in the presence of a polymerization initiator. Specifically, a conventionally known polymerization method may be used such as solution polymerization, emulsion polymerization, suspension polymerization, or bulk polymerization.

Any polymerization initiator may be used. Examples thereof include organic peroxide polymerization initiators and azo polymerization initiators.

Examples of the organic peroxide polymerization initiator include cumene hydroperoxide, benzoyl peroxide, lauroyl peroxide, octanoyl peroxide, stearoyl peroxide, o-chlorobenzoyl peroxide, acetyl peroxide, t-butyl hydroperoxide, t-butyl peroxyacetate, t-butyl peroxyisobutyrate, 3,5,5-trimethylhexanoyl peroxide, t-butyl peroxy-2-ethylhexanoate, and di-t-butyl peroxide.

Examples of the azo polymerization initiator include 2,2'-azobisisobutyronitrile, 2,2'-azobis(2,4-dimethylvaleronitrile), 4,4'-azobis(4-cyanopentanoic acid), and 2,2'-azobis(2-methylbutyronitrile).

These polymerization initiators may be used alone or in combination of two or more thereof. Preferred among them are lauroyl peroxide, octanoyl peroxide, stearoyl peroxide, and 3,5,5-trimethylhexanoyl peroxide from the standpoint of reducing odor of the resulting acrylic polymer (X).

The amount of the polymerization initiator is not limited. The polymerization initiator is preferably used in an amount of about 0.01 to 10 parts by weight, more preferably about 0.05 to 2 parts by weight relative to 100 parts by weight of the monomer mixture.

The lower limit of the softening point of the tackifier resin (Y) is preferably 140° C. and the upper limit thereof is preferably 160° C. With the softening point within the range, the decrease in adhesive force of the adhesive layer with time can be reduced. From the standpoint of further reducing the decrease in adhesive force with time, the upper limit of the softening point is more preferably 150° C.

The softening point of the tackifier resin (Y) can be measured in conformity with JIS K2207.

Examples of the tackifier resin (Y) include petroleum resin-type tackifier resins, hydrogenated petroleum resin-type tackifier resins, rosin-type resins such as rosin diol-type tackifier resins and rosin ester-type tackifier resins, terpene resins, phenolic resins, xylene resins, coumarone resins, ketone resins, and modified resins thereof. These tackifier resins may be used alone or in combination of two or more thereof. Preferred among them are rosin-type tackifier resins from the standpoint of reducing the decrease in adhesive force with time. Rosin ester-type tackifier resins are more preferred.

Examples of the rosin ester-type tackifier resin include disproportionated rosin ester-type, polymerized rosin ester-type, hydrogenated rosin ester-type, and rosin phenol-type tackifier resins.

In the tackifier resin (Y), the amount of a component having a molecular weight of 600 or less is preferably 13% by weight or less. With such a tackifier resin, the amount of volatile components generated from the tackifier resin can be kept low while the adhesiveness is maintained. In addition, since the amount of the low-molecular-weight component is small, the adhesive layer can have relatively high viscosity. The adhesive layer is thus more likely to inhibit the migration of the plasticizer to the adhesive layer and is less likely to suffer the decrease in adhesive force with time.

The component having a molecular weight of 600 or less can be removed from the tackifier resin by, for example, a method involving heating and melting the tackifier resin at a temperature equal to or higher than the softening point, or a method involving blowing water vapor into the tackifier resin.

The molecular weight can be calculated as a value in terms of polystyrene and the amount can be calculated based on the area ratio.

In the adhesive composition, the lower limit of the amount of the tackifier resin (Y) relative to 100 parts by weight of the acrylic polymer (X) is preferably 3 parts by weight and the upper limit thereof is preferably 9 parts by weight. When the amount of the tackifier resin is 3 parts by weight or more, adhesive force to a hard-to-bond material is improved. When the amount of the tackifier resin is 9 parts by weight or less, the migration of the plasticizer to the adhesive layer can be easily suppressed, making it possible to prevent the decrease in adhesive force with time. From the standpoint of increasing adhesive force to a hard-to-bond material and maintaining the adhesive force, the lower limit of the amount of the tackifier resin (Y) is more preferably 4 parts by weight and the upper limit thereof is more preferably 8 parts by weight. The upper limit is still more preferably 7 parts by weight.

The cross-linking agent (Z) functions to enhance the cohesive force of the resulting adhesive layer and improve the physical properties of the adhesive tape.

Any cross-linking agent (Z) may be used. Examples thereof include isocyanate cross-linking agents, epoxy cross-linking agents, aziridine cross-linking agents, and metal chelate cross-linking agents. Preferred among them are isocyanate cross-linking agents and metal chelate cross-linking agents.

Specific examples of the isocyanate cross-linking agent include tolylene diisocyanate, naphtylene-1,5-diisocyanate, and diphenylmethane diisocyanate. Commercially available examples include Coronate L available from Nippon Polyurethane Industry Co., Ltd.

Specific examples of the metal chelate cross-linking agent include chelate compounds in which the metal atom is an aluminum atom, a zirconium atom, a titanium atom, a zinc atom, an iron atom, a tin atom, or the like. Preferred among them are aluminum chelates whose central metal is aluminum. Commercially available aluminum chelates include Aluminum Chelate A and Aluminum Chelate M available from Kawaken Fine Chemicals Co., Ltd.

The amount of the cross-linking agent (Z) in the adhesive composition is not limited. The lower limit thereof relative to 100 parts by weight of the acrylic polymer (X) is preferably 0.005 parts by weight and the upper limit thereof is preferably 5 parts by weight. The lower limit is more preferably 0.01 parts by weight and the upper limit is more preferably 1 part by weight. The lower limit is still more preferably 0.02 parts by weight and the upper limit is still more preferably 0.1 parts by weight.

The adhesive composition may contain, in addition to the acrylic polymer (X), the tackifier resin (Y), and the cross-linking agent (Z), a solvent such as ethyl acetate, dimethyl sulfoxide, ethanol, acetone, or diethyl ether. Preferred among them is ethyl acetate from the standpoint of keeping the amount of volatile components low.

The adhesive composition may further contain additives such as a filler, a pigment, a dye, or an antioxidant as needed.

The lower limit of the thickness of the adhesive layer is preferably 5 μm and the upper limit thereof is preferably 200 μm. The adhesive layer having a thickness within this range can exhibit sufficient adhesiveness. The lower limit of the thickness of the adhesive layer is more preferably 7 μm and the upper limit thereof is more preferably 150 μm. The lower limit is still more preferably 10 μm and the upper limit is still more preferably 100 μm.

The adhesive layer may be formed by any method on at least one surface of the resin foam sheet of the present invention to produce the adhesive tape of the present invention. Examples of the method include a method involving applying the adhesive to at least one surface of the resin foam sheet with an applicator such as a coater, a method involving applying the adhesive to at least one surface of the resin foam sheet by spraying with a spray, and a method involving applying the adhesive to at least one surface of the resin foam sheet with a brush. Alternatively, the adhesive layer may be formed by a method involving attaching a double-sided adhesive tape to at least one surface of the resin foam sheet.

The resin foam, resin foam sheet, and adhesive tape of the present invention are flexible and excellent in shapeability, and thus can be used in various applications such as members for vehicles (e.g., automobiles, aircraft, and ships), members for buildings, electronic components, members for interior materials such as carpet backing materials, and electrical appliances for home and commercial uses.

Examples of the members for interior materials include those used for reducing the vibration, shock, or noise, such as carpet backing materials, curtain materials, and wallpaper.

Examples of the electric members include electronic components in mobile phones, tablet PCs, and PCs, and those used for reducing the vibration, shock, or noise in home appliances such as audio instruments, headphones, TV sets, refrigerators, washing machines, and cleaners, or commercial-use electrical appliances.

Examples of the members for other applications include those used for relaxation of shock upon collision in floors, mats, or walls in indoor/outdoor athletic facilities.

The resin foam, resin foam sheet, and adhesive tape of the present invention are particularly suitable as members for vehicles and members for buildings.

The present invention also encompasses a member for a vehicle including the resin foam, resin foam sheet, or adhesive tape of the present invention.

The present invention also encompasses a member for a building including the resin foam, resin foam sheet, or adhesive tape of the present invention.

Examples of the member for a vehicle include those used for reducing the vibration, shock, or noise, such as ceiling materials, interior materials, and interior lining materials of vehicles including automobiles, aircraft, and ships.

Specific examples of the member for a vehicle include: deadening materials to be directly attached to a steel plate member (e.g., the ceiling, door panel, or floorboard) of a vehicle such as an automobile; and damping materials and cushioning materials to be interposed between a steel plate member constituting the exterior or the framework and an interior resin member.

Examples of the member for a building include those used for reducing the vibration, shock, or noise, such as floor substrates, materials for soundproof walls, ceiling materials, and lining materials for resin or metal roof tiles.

Specific examples of the member for a building include: deadening materials to be directly attached to a metal roof tile made of Galvalume® to reduce rainfall noise; and sound insulation mats to be interposed between a flooring material and a lining material for house flooring.

Advantageous Effects of Invention

The present invention can provide a flexible resin foam having excellent shapeability and a resin foam sheet, an adhesive tape, a member for a vehicle, and a member for a building each including the resin foam.

DESCRIPTION OF EMBODIMENTS

Embodiments of the present invention are more specifically described in the following with reference to, but not limited to, examples.

Example 1

(1) Production of Resin Foam

To 100 parts by weight of polyvinyl butyral 1 (PVB1) were added 40 parts by weight of triethylene glycol di-2-ethylhexanoate (3GO) as plasticizer, 8 parts by weight of VINYFOR AC #3 (available from Eiwa Chemical Inc. Co., Ltd., decomposition temperature: 208° C.) as a heat-decomposable foaming agent, and 0.8 parts by weight of carbon black (available from Tokai Carbon Co., Ltd., SEAST SP) to give a resin composition. The obtained resin composition was sufficiently kneaded at 110° C. with a mixing roll and then extruded from an extruder into a sheet. PVB1 had a hydroxy group content of 31 mol %, a degree of acetylation of 0.7 mol %, a degree of butyralization of 68.3 mol %, and an average degree of polymerization of 1,800.

The obtained sheet was placed in an oven to decompose the heat-decomposable foaming agent at a foaming temperature of 230° C., whereby a resin foam in a sheet form (resin foam sheet) was obtained.

(2) Measurement of Open Cell Ratio and Apparent Density

The open cell ratio of the obtained resin foam was measured by pycnometry in conformity with JIS K7138. The apparent density was obtained by calculation based on the measured weight and the apparent volume obtained from size measurement.

(3) Measurement of Average Cell Size and Average Aspect Ratio of Cells

A resin foam sample for measurement was cut to a size of 50 mm in length, 50 mm in width, and 4 mm in thickness and immersed in liquid nitrogen for one minute. Then, the sample was cut along a plane parallel to the thickness direction using a razor blade.

A magnified photograph (×200) of the cut plane was taken using a digital microscope (VHX-900 available from Keyence Corporation), and the cell size of every cell present in the cut plane within a range of 2 mm in length in the thickness direction was measured.

The same operation was repeated five times at different measurement sites, and the average of all the cell sizes measured in the observation was taken as the average cell size. The cell size of each cell was determined as the diameter of the largest circle inscribed in the cell.

In the measurement of the average cell size, the major axis and minor axis of an ellipse inscribed in each cell observed were measured, and the aspect ratio was obtained by dividing the length of the major axis by the length of the minor axis. The aspect ratios of all the cells observed were obtained, and the average of the obtained aspect ratios was obtained.

(4) Measurement of Elongation Strain and 50% Compression Stress

The elongation strain and 50% compression stress were each measured by a method in conformity with JIS K 6767.

Specifically, a sample having a shape of Type 1 dumbbell specified in JIS K 6251 was punched out from the resin foam sheet. The sample was pulled with a universal tester at a pulling speed of 500 mm/min to measure the elongation strain.

Separately, square samples that were 50 mm on a side were cut out from the resin foam sheet and stacked to a stack thickness of 25 mm or more. The stack sample was compressed with a universal tester at a compression speed of 10 mm/min to measure the 50% compression stress.

Examples 2 to 4

A resin foam was produced and the elongation strain, the 50% compression stress, and other properties were measured as in Example 1 except that the amount of the heat-decomposable foaming agent was as shown in Table 1.

Examples 5 to 7

A resin foam was produced and the elongation strain, the 50% compression stress, and other properties were measured as in Example 1 except that polyvinyl butyral 2 (PVB2) was used instead of polyvinyl butyral 1, and that the amount of the heat-decomposable foaming agent was as shown in Table 1. PVB2 had a hydroxy group content of 22.0 mol %, a degree of acetylation of 4.0 mol %, a degree of butyralization of 74.0 mol %, and an average degree of polymerization of 550.

Comparative Example 1

A commercially available polyethylene foam (available from Sekisui Chemical Co., Ltd., Softlon S, expansion ratio: 5 times) was provided as a comparative example. The elongation strain, the 50% compression stress, and other properties of the polyethylene foam were measured as in Example 1.

Comparative Example 2

A commercially available polyethylene foam (available from Sekisui Chemical Co., Ltd., Softlon S, expansion ratio: 10 times) was provided as a comparative example. The elongation strain, the 50% compression stress, and other properties of the polyethylene foam were measured as in Example 1.

Comparative Example 3

A commercially available polyethylene foam (available from Sekisui Chemical Co., Ltd., Softlon S, expansion ratio: 15 times) was provided as a comparative example. The elongation strain, the 50% compression stress, and other properties of the polyethylene foam were measured as in Example 1.

Comparative Example 4

A commercially available polyurethane foam (available from NHK Spring Co., Ltd., Super Sheet SS-H6, expansion ratio: 15 times) was provided as a comparative example. The elongation strain, the 50% compression stress, and other properties of the polyurethane foam were measured as in Example 1.

(Evaluation)

The resin foams obtained in Examples 1 to 7 and Comparative Examples 1 to 4 were evaluated as follows.

Table 1 shows the results.

(1) Evaluation of Shapeability

An adhesive was applied to one surface of the foam. The foam was put on a polycarbonate corrugated sheet with a pitch of 32 mm and a trough depth of 9 mm such that the foam came into contact with only the crests of the corrugated sheet. The portions of the foam not in contact with the sheet were stretched to be pressed against the troughs, whereby the foam was attached to the sheet. At this time, the presence or absence of breaking or partial thinning of the foam was observed. The shapeability of the resin foam was evaluated according to the following criteria.

○ (Good): No breaking or thinning was observed.

x (Poor): Breaking or thinning was observed.

(2) Evaluation of Flexibility

The foam was formed into a corrugated sheet shape. A SUS ball having a diameter of ½ inch was allowed to stand in a trough for one minute. The SUS ball was removed, and the presence or absence of a mark left by sinking of the ball into the foam was observed. The flexibility of the resin foam was evaluated according to the following criteria.

○ (Good): A mark left by sinking of the SUS ball was observed.

x (Poor): The mark was not observed.

TABLE 1

|  |  |  |  | Example 1 | Example 2 | Example 3 | Example 4 | Example 5 | Example 6 |
|---|---|---|---|---|---|---|---|---|---|
| Resin composition | Thermoplastic resin | Type | — | PVB1 | PVB1 | PVB1 | PVB1 | PVB2 | PVB2 |
|  |  | Amount | Parts by weight | 100 | 100 | 100 | 100 | 100 | 100 |
|  | Plasticizer | Type | — | 3GO | 3GO | 3GO | 3GO | 3GO | 3GO |
|  |  | Amount | Parts by weight | 40 | 40 | 40 | 40 | 40 | 40 |
|  | Foaming agent | Type | — | VINYFOR AC#3 | VINYFOR AC#3 | VINYFOR AC#3 | VINYFOR AC#3 | VINYFOR AC#3 | VINYFOR AC#3 |
|  |  | Amount | Parts by weight | 8 | 5 | 3 | 12 | 8 | 3 |
|  | Other components | Type | — | Carbon black | Carbon black | Carbon black | Carbon black | Carbon black | Carbon black |
|  |  | Amount | Parts by weight | 0.8 | 0.8 | 0.8 | 0.8 | 0.8 | 0.8 |
| Resin foam | Open cell ratio | | % | 88 | 80 | 35 | 90 | 82 | 85 |
|  | Apparent density | | kg/m³ | 110 | 150 | 300 | 60 | 160 | 330 |
|  | Average aspect ratio | | — | 1.1 | 1.0 | 1.1 | 1.0 | 1.0 | 1.0 |
|  | Average cell size | | μm | 200 | 200 | 150 | 250 | 180 | 150 |
|  | Elongation strain | | % | 430 | 520 | 580 | 350 | 370 | 420 |
|  | 50% compression stress | | kPa | 13 | 20 | 45 | 15 | 18 | 13 |
| Evaluation | Shapeability | | | ○ | ○ | ○ | ○ | ○ | ○ |
|  | Flexibility | | | ○ | ○ | ○ | ○ | ○ | ○ |

|  |  |  |  | Example 7 | Comparative Example 1 | Comparative Example 2 | Comparative Example 3 | Comparative Example 4 |
|---|---|---|---|---|---|---|---|---|
| Resin composition | Thermoplastic resin | Type | — | PVB2 | Polyethylene foam | Polyethylene foam | Polyethylene foam | Polyurethane foam |
|  |  | Amount | Parts by weight | 100 | | | | |
|  | Plasticizer | Type | — | 3GO | | | | |
|  |  | Amount | Parts by weight | 20 | | | | |
|  | Foaming agent | Type | — | VINYFOR AC#3 | | | | |
|  |  | Amount | Parts by weight | 12 | | | | |
|  | Other components | Type | — | Carbon black | | | | |
|  |  | Amount | Parts by weight | 0.8 | | | | |
| Resin foam | Open cell ratio | | % | 93 | <5 | <5 | <5 | >90 |
|  | Apparent density | | kg/m³ | 100 | 200 | 100 | 60 | 60 |
|  | Average aspect ratio | | — | 1.0 | 1.2 | 1.1 | 1.1 | 1.0 |
|  | Average cell size | | μm | 200 | 200 | 150 | 150 | 200 |
|  | Elongation strain | | % | 420 | 390 | 310 | 240 | 140 |
|  | 50% compression stress | | kPa | 22 | 150 | 90 | 60 | 13 |
| Evaluation | Shapeability | | | ○ | ○ | x | x | x |
|  | Flexibility | | | ○ | x | x | ○ | ○ |

Example 8

A double-sided adhesive tape for fixing an interior member (available from Sekisui Chemical Co., Ltd., #5782) as an adhesive layer was attached to one surface of the resin foam sheet obtained in Example 1 to give a one-sided adhesive tape.

The obtained one-sided adhesive tape exhibited adhesiveness while maintaining the flexibility and sound insulation properties of the resin foam sheet of Example 1.

Example 9

(1) Production of Acrylic Polymer

Into a reaction container were introduced 100 parts by weight of n-butyl acrylate and 11 parts by weight of acrylic acid to give a monomer component. The monomer component was dissolved in ethyl acetate, to which 0.1 parts by weight of lauroyl peroxide as a polymerization initiator was added at the reflux point. The solution was refluxed at 70° C. for five hours to give a solution of an acrylic polymer having a weight average molecular weight of 720,000.

(2) Production of Adhesive Composition and Adhesive Tape

To the obtained acrylic polymer solution were added 6.3 parts by weight of a polymerized rosin ester-type tackifier resin (softening point: 140° C.) containing 13% a component having a molecular weight of 600 or less and 0.054 parts by weight of an aluminum chelate, which is a metal chelate cross-linking agent, as a cross-linking agent relative to 100 parts by weight of the acrylic polymer (i.e., the non-volatile component of the acrylic polymer solution). They were then uniformly mixed to give an adhesive composition.

Subsequently, the obtained adhesive composition was applied to one surface of the resin foam sheet obtained in Example 1. The adhesive composition was then dried at 120° C. for five minutes to form a one-sided adhesive tape in which an adhesive layer having a thickness of 60 μm was laminated on one surface of the resin foam sheet.

The obtained one-sided adhesive tape exhibited adhesiveness while maintaining the flexibility and sound insulation properties of the resin foam sheet of Example 1.

(Evaluation)

The one-sided adhesive tapes obtained in Examples 8 and 9 were evaluated as follows.

(Plasticizer Resistance Evaluation)

(1) Sample Preparation

Each of the one-sided adhesive tapes obtained in Examples 8 and 9 was cut to a size of 25 mm in width×150 mm in length, and pressure-bonded to SUS304 (BA surface finish) specified in JIS G4305 by reciprocating a 2-kg rubber roller once at 10 mm/sec in conformity with JIS Z0237.

(2) Measurement of Initial Adhesive Force

The one-sided adhesive tape obtained in the sample preparation was left to stand at 23° C. and 50% RH for 20 minutes after the pressure bonding. The 90° peel test was then performed three times in conformity with JIS 20237. The average value was taken as the initial adhesive force (N/25 mm). The peeling speed was 300 ram/min.

(3) Measurement of Aged Adhesive Force

The sample prepared in the sample preparation was left to stand in an atmosphere at 60° C. for 72 hours, then at 23° C. and 50% RH for 30 minutes. The 90° peel test was then performed three times in conformity with JIS 20237. The average value was taken as the aged adhesive force (N/25 mm).

(4) Evaluation of Adhesive Force Retention

The adhesive force retention (%) was calculated by the following formula based on the initial adhesive force and aged adhesive force obtained above.

Adhesive force retention (%)=100×(Aged adhesive force/Initial adhesive force)

The adhesive force retention of the one-sided adhesive tape obtained in Example 9 was greatly improved as compared with that of the one-sided adhesive tape obtained in Example 8.

INDUSTRIAL APPLICABILITY

The present invention can provide a flexible resin foam having excellent shapeability and a resin foam sheet, an adhesive tape, a member for a vehicle, and a member for a building each including the resin foam.

The invention claimed is:

1. A resin foam having a multitude of cells, the resin foam comprising:
    a thermoplastic resin; and
    a plasticizer,
    wherein the thermoplastic resin consists of a polyvinyl acetal, and
    the resin foam has an elongation strain of 300% or more and a 50% compression stress of 70 kPa or less.

2. The resin foam according to claim 1,
    wherein the elongation strain is 400% or more and the 50% compression stress is 30 kPa or less.

3. The resin foam according to claim 1, comprising an adhesive.

4. A resin foam sheet comprising:
    the resin foam according to claim 1.

5. An adhesive tape comprising:
    the resin foam sheet according to claim 4; and
    an adhesive layer provided on at least one surface of the resin foam sheet.

6. A member for a vehicle, comprising:
    the resin foam according to claim 1.

7. A member for a building, comprising:
    the resin foam according to claim 1.

* * * * *